United States Patent [19]
Price-Francis

[11] Patent Number: 5,815,252
[45] Date of Patent: Sep. 29, 1998

[54] BIOMETRIC IDENTIFICATION PROCESS AND SYSTEM UTILIZING MULTIPLE PARAMETERS SCANS FOR REDUCTION OF FALSE NEGATIVES

[75] Inventor: Stephen Price-Francis, Huntington, N.Y.

[73] Assignee: Canon Kabushiki Kaisha, Tokyo, Japan

[21] Appl. No.: 561,323

[22] Filed: Nov. 21, 1995

Related U.S. Application Data

[63] Continuation-in-part of Ser. No. 523,328, Sep. 5, 1995, abandoned.

[51] Int. Cl.$^6$ ............................... G06K 9/74; G07D 7/00
[52] U.S. Cl. ....................... 356/71; 340/825.34; 382/115; 382/116; 382/124; 235/492
[58] Field of Search ............................... 356/7.1; 235/492; 340/825.3–825.34; 382/124–127, 115–119

[56] References Cited

U.S. PATENT DOCUMENTS

| | | | |
|---|---|---|---|
| 4,151,512 | 4/1979 | Riganati et al. | 340/146.3 E |
| 4,202,120 | 5/1980 | Engel | 356/71 |
| 4,210,899 | 7/1980 | Swonger et al. | 340/825.34 |
| 4,582,985 | 4/1986 | Löfberg | 235/492 |
| 4,805,223 | 2/1989 | Denyer . | |
| 4,876,725 | 10/1989 | Tomko | 356/71 |
| 4,975,969 | 12/1990 | Tal | 340/825.34 |
| 4,983,036 | 1/1991 | Froelick | 356/71 |
| 4,993,068 | 2/1991 | Piosenka et al. | 340/825.34 |
| 5,054,089 | 10/1991 | Uchida et al. | 356/71 |
| 5,095,194 | 3/1992 | Barbanell | 235/379 |
| 5,144,680 | 9/1992 | Kobayashi et al. | 356/71 |
| 5,180,901 | 1/1993 | Hiramatsu | 340/825.34 |
| 5,239,166 | 8/1993 | Graves | 235/492 |
| 5,245,329 | 9/1993 | Gokcebay | 340/825.31 |
| 5,337,043 | 8/1994 | Gokcebay | 340/825.31 |
| 5,363,453 | 11/1994 | Gagne et al. | 340/825.31 |
| 5,581,630 | 12/1996 | Bonneau, Jr. | 340/825.34 |

FOREIGN PATENT DOCUMENTS

| | | |
|---|---|---|
| 0010611 | 5/1980 | European Pat. Off. . |
| 0504616 | 9/1992 | European Pat. Off. . |
| 2585153 | 1/1987 | France . |
| 2634570 | 1/1990 | France . |
| WO 95/02225 | 1/1995 | WIPO . |

Primary Examiner—David C. Nelms
Assistant Examiner—Jason D Vierra-Eisenberg
Attorney, Agent, or Firm—Fitzpatrick, Cella, Harper & Scinto

[57] ABSTRACT

A system for verifying that a card possessor is the authorized card owner compares scanned fingerprint data with fingerprint data encoded on an optical card. More than one of the person's fingerprints are encoded on the card, and the process of identification of the card possessor involves the random selection of separate fingerprints for scanning and comparison against the encoded fingerprints. A card reader/writer reads fingerprint characteristic information from an optical card inserted therein and a processing unit, connected to a fingerprint scanner and card reader/writer extracts from the scanned fingerprint certain well known indicators, and matches the recorded fingerprint characteristic data with the scanned fingerprint characteristics to establish identity therebetween.

37 Claims, 5 Drawing Sheets

BIOMETRIC IDENTIFICATION PROCESS AND SYSTEM UTILIZING MULTIPLE PARAMETERS SCANS FOR REDUCTION OF FALSE NEGATIVES

CROSS REFERENCE TO RELATED APPLICATION

This application is a continuation-in-part of application Ser. No. 08/523,328, filed Sep. 5, 1995 now abandoned.

BACKGROUND OF THE INVENTION

FIELD OF THE INVENTION

The present invention is generally related to a method and system for verifying the identity of a person, notably by comparing certain physical characteristics of the person, in one embodiment, the fingerprint of the person, with a recorded copy of information corresponding to the characteristics of that person provided on an optical card. In the present invention, the process of verifying the identity of the individual card owner involves the successive and sequential comparisons of one or more single characteristics, e.g., fingerprints, preferably randomly selected if more than one is required to verify the identity. This method of proceeding facilitates an identification of the individual while maintaining a higher degree of accuracy due to the possible use of higher degrees of correlation that those that are normally available when matching a single physical characteristic.

BACKGROUND OF THE INVENTION

Currently, bank cards are used throughout the world which comprise one of more magnetic strips or other recording medium on or in the card, carrying coded information thereon. Although simple to use, there is no inherent means in the card for verifying that the person presenting the card is actually the true owner of the card. While in many circumstances a user, will input a Personal Identification Number (PIN) into a bank card machine, the level of security afforded is still not high, given that many users will write down a PIN number in a check book or the like, making the number easily accessible to a criminal.

There are other circumstances in which a verification of the identity of persons is necessary. Debit and Point-of-Sale cards are gaining the same popularity as credit cards. Welfare systems are investigating automatic distribution of benefits through a carded system. When businessmen travel between countries it is necessary to verify the identify of each person passing through customs and identify each as citizen, resident alien, permanent resident and the like. The identification must be accurate, but not too rigorous to be inconvenient. There are a number of possibilities for biometric identification including physical features, hand geometry, retinal scans, facial images, fingerprints and the like.

It has been proposed by many that the minute details of a person's fingerprint could be encoded (i.e., in binary coded form) into memory on a card. For example, a coded version of a fingerprint can be stored upon a card. When verification is required, it is necessary for the user to display his fingerprint to a scanner, and at the same time insert a card into a reader which extracts the coded information identifying the fingerprint, and with a processor, compare the authorized owner's fingerprint with the stored characteristics of the owner's fingerprint.

However, the accuracy of such systems is limited, since normally these systems only record some of the characteristics of a person's fingerprint on the card. And the environmental measurement conditions and positions must be matched as well. False rejections are very common on the single fingerprint identification systems. A rotated or rolled fingerprint, fingerprints taken or scanned with different pressures of the finger on the scanner while it is being scanned initially, dirt, a blemish or other injury on the finger being scanned, all are potential problems leading to false rejections. While conserving memory requirements, the accuracy of such methods, using only a single fingerprint, can be very low. The comparison of a single scanned finger with the corresponding recorded fingerprint information thereto, may incorrectly provide false rejections due to any of these conditions. For example, these systems do not account for temporal perturbations, e.g., a scraped, burned or cut finger, that may exist on the owner's finger, thereby giving rise to a false reading of the single fingerprint image.

The need to verify with accuracy the identity of a card owner is necessary in a wide variety of circumstances, including at a passport and immigration check, at banking and other financial systems, high security areas and the like. What is needed is a method making it more difficult for criminals to fraudulently use a stolen card and the like. As more and more accuracy is required the probability of false rejections increases. The need for a simple, more accurate method which facilitates the verification process is thus of increasing importance.

SUMMARY OF THE INVENTION

Accordingly, the present invention provides a method and system for verifying identification of a person with increased accuracy, while concomitantly, reducing the probability of false rejection for the authorized card owner.

The method includes the steps of comparing a scanned physical characteristic, such as a fingerprint, with recorded information corresponding to the scanned physical characteristic, e.g., a fingerprint, as known in the art, but goes beyond the state of the art by using a novel process of randomly and sequentially selecting more than one physical characteristic for scanning and comparison against recorded characteristic data, thus enhancing the accuracy of the individual identification process and reducing the probability of improper false rejections.

In this manner the invention can be used for persons temporarily disabled due to broken bones or to sprained muscles, paraplegic persons, persons who cannot provide a certain finger for scanning due to a recent accident, for example, or victims of intentional maiming or accidents who no longer possess a hand or have lost fingers. Furthermore, the invention accounts for a poor scan, resulting in an improper false rejection, for example, on a single fingerprint, or rejections due to injuries or to dirt or blemishes on the selected finger or the scanning equipment. The invention advantageously reduces the number of false rejections while at the same time enabling the use of a high comparison correlation to ensure a low number of false acceptances.

The system utilized by the method of the invention includes a storage medium, preferably portable, and more preferably an optical card, storing more than one characteristic, e.g., fingerprint, of the authorized card owner, a device for reading the stored characteristics, preferably a card reader/writer into which the card is inserted, or placed thereon, and which accesses the recorded characteristic data of the card owner, a scanner (reading means) for reading a selected physical characteristic, e.g., fingerprint of the card owner, and a Processing Unit (PU) for extracting essential characteristics of the scanned body part and comparing these characteristics with the recorded physical characteristics.

Potential applications of the invention include, for example, controlling entry at passport and immigration checkpoints, ensuring personal identification in financial transactions (e.g., credit card systems), and enhancing security at high security installations, and the like.

Therefore, it is an object of the present invention to provide a method that increases the accuracy of the security identification through the use of higher degrees of correlation.

It is another object of the invention to facilitate verification of identity by decreasing the probability of false rejections in the identification process of an authorized card owner, while not permitting unlawful use in attempting to circumvent personal data protection.

Another object of the invention is to provide an individual recognition system comprising: a storage medium storing as biometric data a plurality of physical characteristics of a user; reading means for extracting from the user biometric data representing one of the physical characteristics stored by the storage means; comparison means for determining whether or not the extracted biometric data represents the same physical characteristic as corresponding stored biometric data obtained from the storage medium; and control means for instructing the reading means to extract from the user additional biometric data representing a different physical characteristic stored by the storage means, depending on the determination by said comparison means.

Yet another object of the invention is to provide a personal identification method using a data storage medium containing previously stored biometric data representing a plurality of physical characteristics of a user, the method comprising: extracting from the user biometric data representing one of the physical characteristics stored by the storage medium; determining whether or not the extracted biometric data represents the same physical characteristics as corresponding stored biometric data obtained from the storage medium; and extracting from the user additional biometric data representing a different physical characteristic stored in the storage medium depending on the determination at the determining step.

Still another object of the invention is to provide an individual recognition system for use with a storage medium on which biometric data corresponding to a plurality of physical characteristics of the user has been stored, the system comprising: reading means for extracting from the user biometric data representing one of the physical characteristics stored by the storage means; comparison means for determining whether or not the extracted biometric data represents the same physical characteristic as corresponding stored biometric data obtained from the storage medium; and control means for instructing the reading means to extract from the user additional biometric data representing a different physical characteristic stored by the storage medium, depending on the determination by the comparison means.

Other objects and features of the present invention will be apparent from the following detailed description in conjunction with the accompanying drawings.

DETAILED DESCRIPTION OF THE PREFERRED EMBODIMENT

Figure 1:
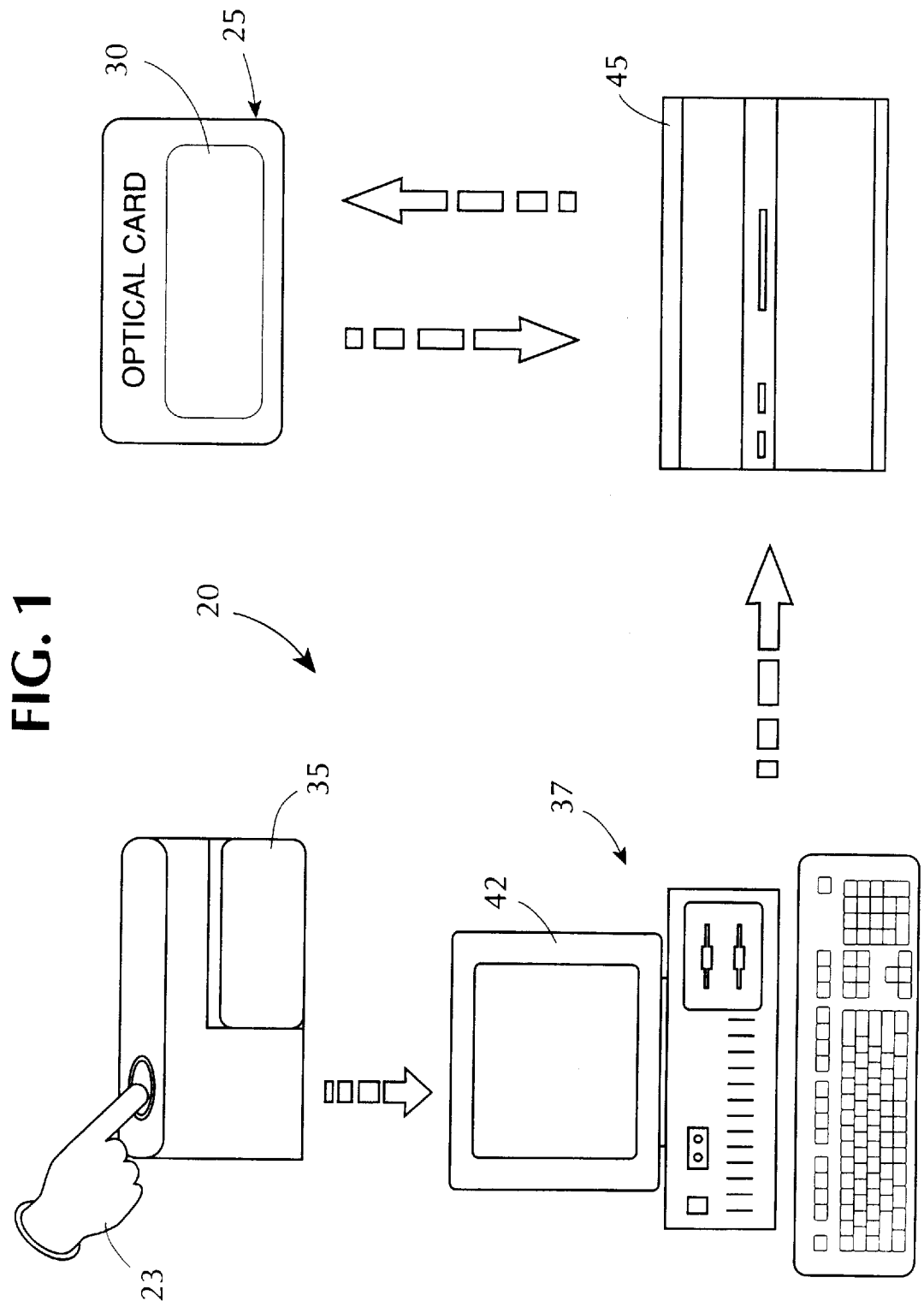
FIG. 1 shows the system components for a preferred embodiment for carrying out the method of the invention.
Figure 3:
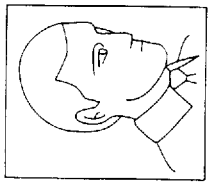
FIG. 3 provides an example of the information, including a physical representation of the user's fingerprint, that might be printed on the front of the user's card, the reverse of which carries the coded fingerprint data as shown in FIG. 1.

FIG. 1 shows an embodiment of a fingerprint identification system 20 for carrying out the method of the present invention. Using the system 20 of FIG. 1, the fingerprints of the card owner 23 are stored on the encoded portion of an optical card 25, as part of individual identification information. As shown in FIG. 3, the identity card 25 can also contain other various biometric and representative information about the individual card owner 23, recorded physically on the face of the card, as at reference numeral 28 of FIG. 5, or encoded thereon, as at reference numeral 29 of FIG. 5, or recorded on electronic or optical media 30 of FIG. 1, including, for example, name, account number, date of birth, sex, height, weight, information on citizenship, health inspection or health information and the like might be maintained. The optical card 25 also comprises memory 30 shown in FIG. 1 for storing the fingerprint data. Preferably, only certain characteristics of a plurality of fingerprints are stored on the card 25, thereby conserving memory space. The memory capacity can be reduced down to only about 1 Kbyte per fingerprint when only certain key characteristic features are encoded. Such fingerprint characteristics are preferably limited to a few significant features such as the depth and interval of the fingerprint, ridge pattern information, or key features relating to the number and kind of vortices, arcs, crossings and other line forms shown by the fingerprints. However, it should be noted that optical cards with a large memory capacity are available, but it may be advisable for other reasons to limit the amount of data recorded therein (for example, correlation thereof would require the processing unit used with the present system to have excessive computational capacity). Extraction and matching software libraries (not shown) can be used of the type developed by The Phoenix Group, Inc. of Pittsburg, Kans. However, the present invention works well with any fingerprint matching system.

In the present invention, data representing the characteristic features of a plurality of fingerprints, which may be all of the fingerprints or only a limited number of fingerprints from each hand of an authorized person, are preferably coded and stored on the card 25, in the form of a binary or multi-value coded signal. This is preferably done by scanning designated fingers of the person when issuing a card 25 on similar equipment 20 to that which will be used during verification. Any number of fingerprints may be chosen for scanning from one to all five fingers on each hand. Therefore, the card 25 storage mechanism 30 carries information relating to more than one finger of the person 23, as explained more fully below, so that the system can request alternative fingerprint information if one of more of the fingers are either not available of scanning, due to cuts, blemishes or other injury, or a defective fingerprint was originally taken or if a first or later scans fail to confirm the identify of the card holder.

Although the disclosed preferred embodiment has been described as utilizing fingerprint data, any biometric data representing a plurality of physical characteristics can be utilized. For example, retinal scans of both of a cardholder's eyes can be encoded onto the card. Similarly, palm prints of each of the cardholder's hands can also be used. In fact, the present invention is not limited to such obvious groupings of physical characteristics. For example, the left hand print, right eye retinal scan, and right hand fingerprints can all be stored on the optical card and randomly selected ones of the body parts corresponding to such characteristics required to be presented for verification. Biometric data representing other physical characteristics, such as the cardholder's signature (its appearance or characteristics of how the cardholder forms his signature), facial characteristics, or keyboard dynamics (such as keying pressure, rate, sequence, or the like) can also be compared.

Figure 2:
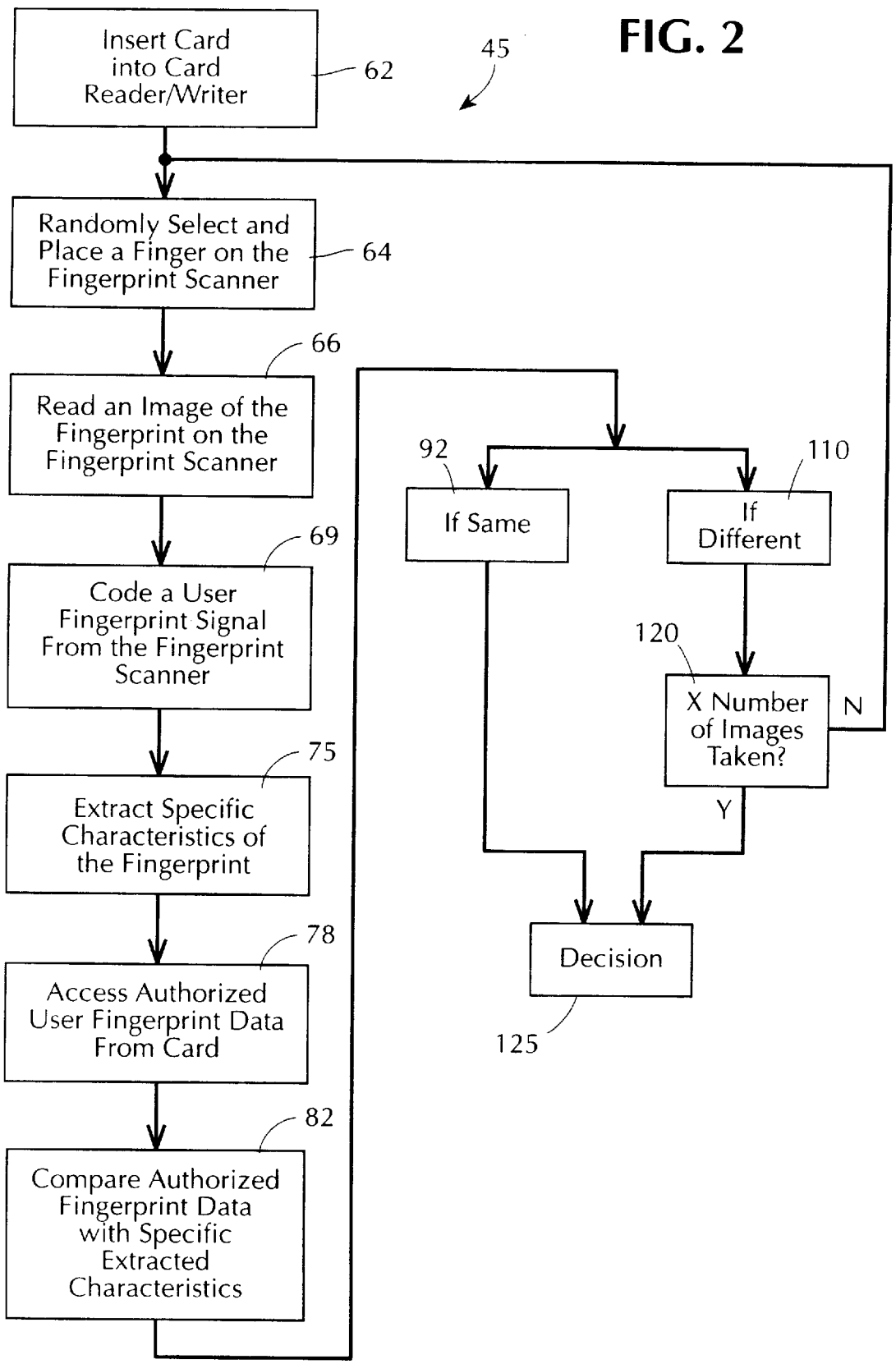
FIG. 2 represents the main stages of the method according to the invention in the form of a flowchart.

The remaining components of FIG. 1, namely those designate by reference numerals 35, 37, 42, 45 will be described in relation to the flowchart, as depicted in FIG. 2, showing the main steps when using the invention. The process of identification of the individual card owner 23 with the current invention is based upon the random measurement of successive and sequential single fingerprints, as opposed to the measurement of all fingerprints or merely the measurement of only a single fingerprint.

The process 45 strikes an acceptable balance between confirmation of the identity of the card holder 23 (a low number of false acceptances) with a facilitation or ease of use of the system 20 (a low number of false rejections). The balance is achieved with two basic components. Facilitation is achieved by the use of multiple (random) fingerprint comparisons. Therefore, if a problem, environmental or physical, impedes a first match, other fingers can be called for and scanned until a match is achieved. Thus a high correlation of fingerprint attributes can be required for a match, increasing the accuracy of the verification of the identity of the user. The random nature of requests for specific fingers on either or both hands further impedes criminal activity. Finally, preferably, after a predetermined number of attempts, a decision can be made to terminate the process with a rejection. The fact that a rejection occurs only after a predetermined number of unsuccessful comparisons advantageously results in a minimum of false rejections, while also allowing each individual comparison to utilize a high comparison correlation so that security is maximized.

Referring to the flow chart in FIG. 2, to initiate 62 the process 45, the owner 23 inserts a card 25 into a card reader/writer 45. Preferably, either by a display 42 or some other means, the card owner is also requested 64 to place one of his or her fingers on the fingerprint scanner 35. In this instance, the particular hand and associated finger requested for scanning is random, as the result of any conventional random algorithm. The fingerprint scanner 35 can be any of a wide range of suitable scanners, such as those manufactured by Digital Biometrics, Inc. The scanner 35 comprises a fingerpress having a transparent section through which the fingerprint image can be obtained.

Figure 4:
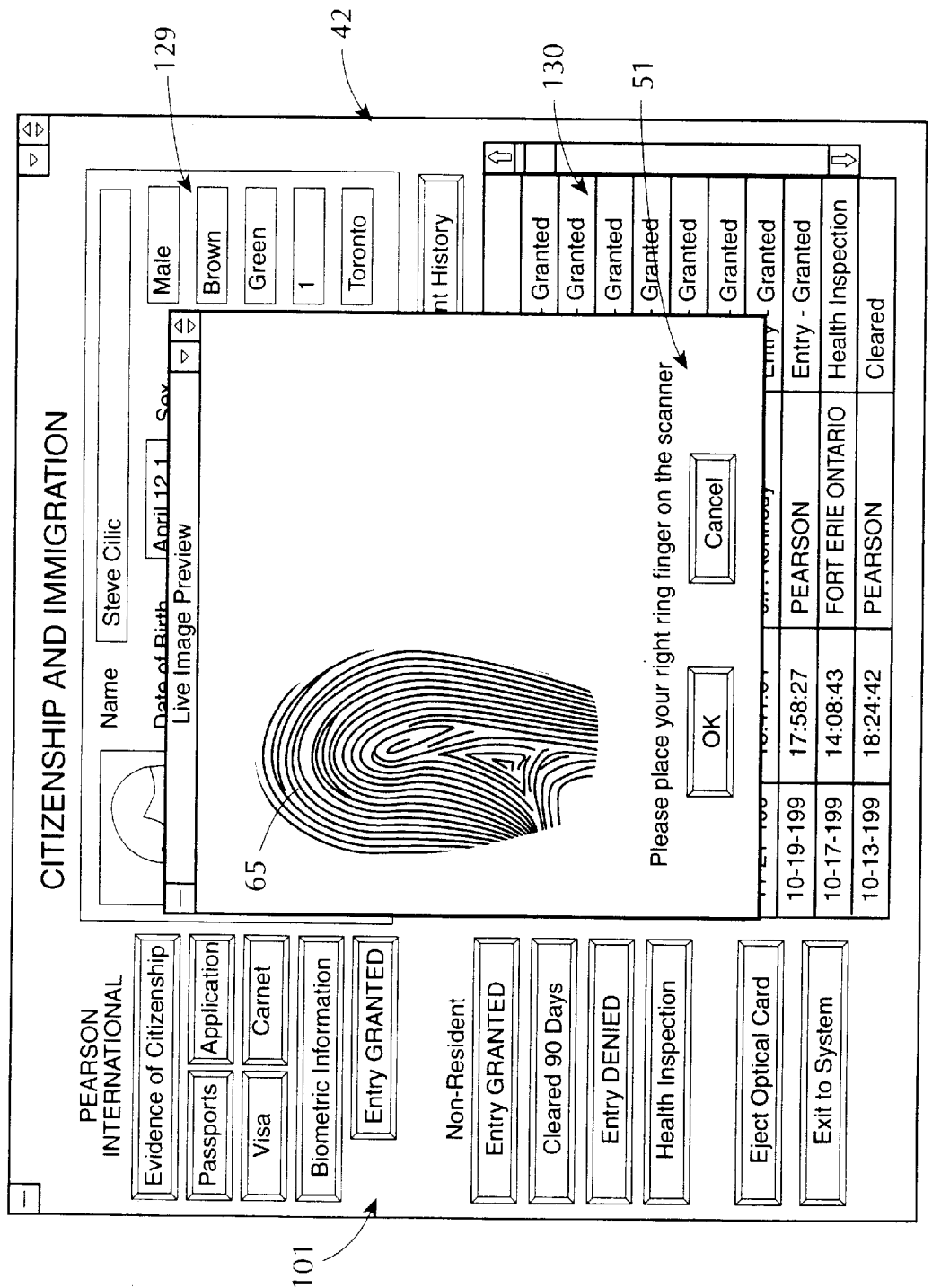
FIG. 4 demonstrates the instructions to place the randomly selected finger and the Live Image Preview which might be obtained by the user following the instruction.

The scanner 35 reads an image 65, as shown in FIG. 4, of the selected fingerprint of the user 66. Similar to the process of encoding the fingerprint characteristic data onto the card 25, described above, the scanning can be carried out using a number of techniques, e.g., optically using high intensity illumination and an array of photosensitive diodes as a camera to record an image, or some other optical scanning device such as a laser scanner, to provide an image which can be processed electronically.

The fingerprint pattern is converted to an electric signal 69 and sent to a peripheral PU 37 or to a PU 37 in the scanner 35 itself. In the preferred embodiment, the extraction and matching programs are stored in the memory of PU 37. Therefore, the fingerprint is transformed into an electronic signal which is coded into a binary or multi-value coded signal. Thereafter, certain characteristic patterns are extracted 75 preferably using the same extraction program as that used to encode the fingerprints. The extracted characteristics preferably correspond to those encoded onto the optical card. As mentioned above, with reference to the card encoding process, such fingerprint characteristics are preferably significant features such as the depth and interval of the fingerprint, ridge pattern information, or key features relating to the number and kind of vortices, arcs, crossings and other line forms shown by the fingerprints. The characteristic extracted are used by the matching program for comparison with the fingerprint characteristic data encoded in the optical card.

As shown in FIG. 2, the recorded data of the particular scanned fingerprint is accessed 78 from the optical card using an optical card reader 45 such as the RW-20 Reader/Writer manufactured by Canon Inc. of Japan. The card reader/writer 45 receives the recorded fingerprint characteristic information on the card owner corresponding to the scanned fingerprint. The card reader/writer 45 outputs the recorded fingerprint information to the PU 37. The PU 37 can display the scanned fingerprint 65, along with the directive 51 indicating which finger is to be/has been scanned, as shown in FIG. 4.

The next step is the comparison of the recorded fingerprint data with the specific extracted characteristics from the scanned fingerprint using the matching program 82. The extraction and matching algorithms are preferably implemented into software stored by the PU 37. The comparison of the recorded data with the scanned fingerprint information can be made according to any of the conventional matching algorithms depending primarily on the characteristic features extracted from the fingerprint image.

If a predetermined correlation exists between the recorded fingerprint characteristic data and the scanned fingerprint extracted characteristics at 92, a display associated with the PU 37 can either indicate the identification confirmation as by 101 of FIG. 4, or alternatively, a decision signal can be sent at 125 from the PU 37 to an operational device (not shown) such as a door or gate for security situations, coded lights can flash or the result can be displayed on one or more screens. The decisional pass/fail signal at 125 may also be transmitted back to the card reader/writer 45 to retain the card at 78 in a failure to identify situation or optically or otherwise mark the card at 78 to indicate border crossings, access to secured areas or other encoded records on the card at 78. A remotely located display (not shown) may also indicate that a match has been found, and thereby confirm identification. Instead of indicating confirmation on a display, of course, the verification decision can also be indicated through illumination of a specified color of light or other expedient, such as the opening of a door or gate.

However, if no match has been found, at 110, instead of immediately denying entrance or access to or identification of the individual, as the case may be, the present invention allows for the successive and sequential placement of further fingers onto the fingerprint scanner 115. Therefore, by allowing for comparison of two or more fingerprints, the possibility of a defective signal based on an obscured or unavailable fingerprint, environmental factors, such as excess moisture on the fingers, or any artifact preventing a match from being made, can be compensated for by the method of the present invention. As mentioned above, the optical card carries information preferably related to at least two fingers on each hand.

In the preferred embodiment, if there was not a positive match on the first fingerprint, another finger, preferably associated with the other hand and chosen at random, is requested to be placed onto the fingerprint scanner. This finger is scanned by the fingerprint scanner and the same process, disclosed above, and as shown in FIG. 2, is commenced until a decision is made either indicating a match or the lack thereof.

If in the second scan there is no match, a third finger is randomly selected for scanning and measurement. If again there is no match with the third randomly selected finger at 120, recognition of the individual carrying the optical card could be denied at 125 or additional attempts to verify identification could be pursued.

This method of allowing multiple attempts facilitates use of the card 25 and verification of the identity of the individual, while the use of higher degrees of correlation assures that the security of accurate identification is not sacrificed. Therefore, the system 20 for use in the method of the invention preferably comprises a fingerprint scanner 35 to scan one or more fingers in successive and sequential order; card reader/writer 45 for receiving recorded fingerprint characteristic information from an optical card 25 inserted therein on the user corresponding to the particular scanned finger(s); and a PU 37, connected to the fingerprint scanner 35 and card reader/writer 45, for creating a coded signal representing the characteristics of the scanned fingerprint, extracting from the scanned fingerprint certain well known indicators, and matching the recorded fingerprint characteristic data with the scanned fingerprint extracted characteristics to establish identity therebetween.

Figure 5:
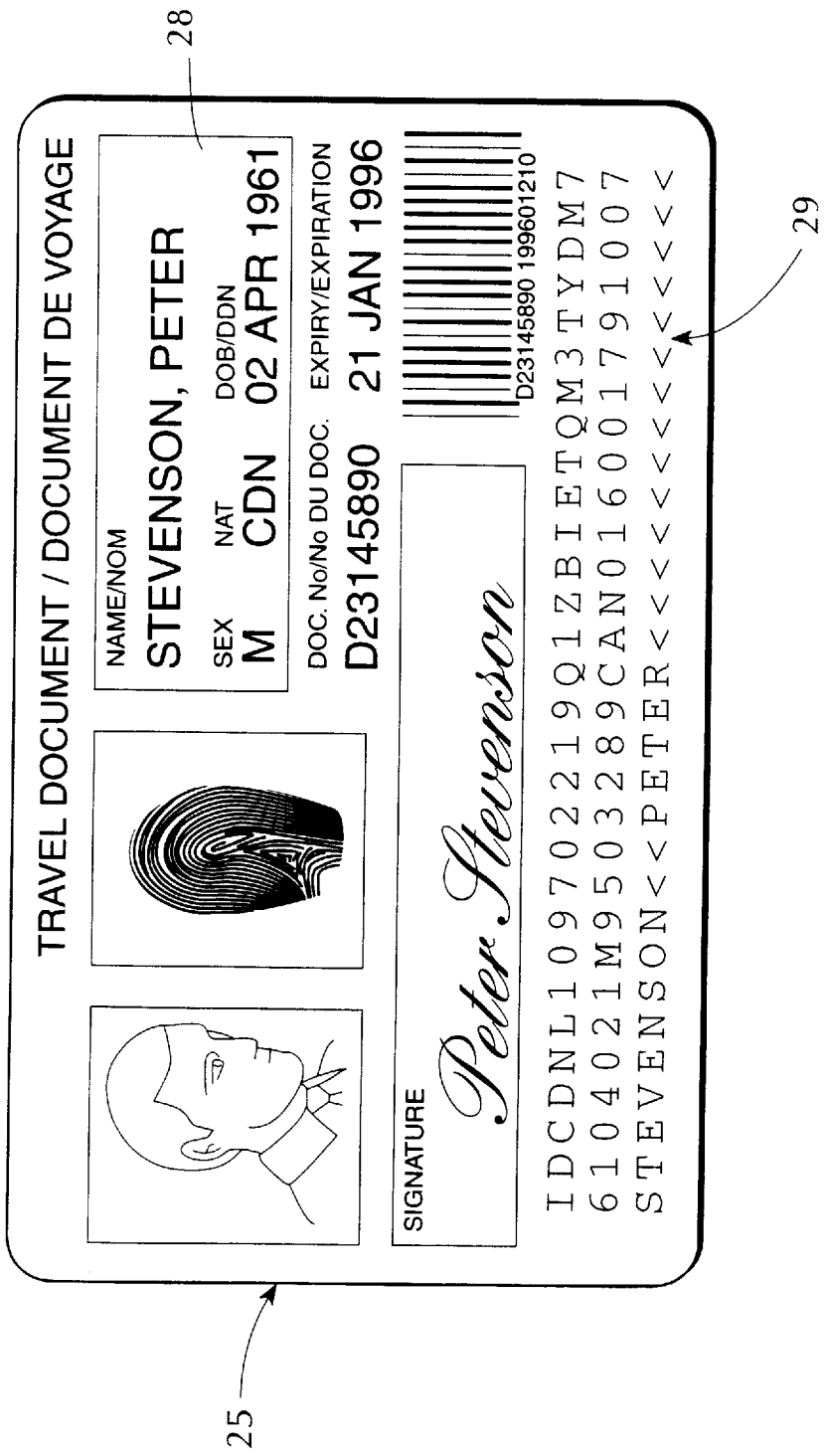
FIG. 5 shows the resulting information which can be downloaded to the scanning station when the user's identity has been verified that can be displayed on the host CPU at a passport or immigration entry point.

In addition to the fingerprint characteristics, the card can also contain other various biometric and representative information 28, 29, as shown, for example, in FIG. 5, about the individual card owner, inscribed on the card or electronically or optically stored, including, for example, the name, bank account number, date of birth, sex, height, weight, etc., and specifically, for a passport, the recorded media can contain information on citizenship, health inspection and a complete catalog of travel history 130, all of which can be displayed at 129, 130 on the PU 37 at any given location, as shown in the sample display 42 of FIG. 3.

The present invention is useful in many applications. For example, a government may issue cards to be used by authorized recipients of various government services, such as health insurance, welfare benefits, social security benefits, driver's licenses, or the like. The present invention can be used to prevent imposters from receiving such services. In this context, it should be noted that biometric data representing physical characteristics of a plurality of persons, for example, a family, can be stored on a single optical card whereby, for example, any member of a family qualifying for government services can present the card and be identified as a qualified recipient of such services.

In another embodiment of the present invention, the storage medium, rather than be portable, can exist at a fixed location along with storage media storing biometric data for a number of other persons. For example, at secured facilities in which a limited number of people (e.g., employees) routinely request access, the storage medium can be built into a main computer system as a series of secured memory locations. In such a system, an employee, for example, seeking access to the secured facility can have his identity verified without producing a card since the system can make the required comparison by requesting presentation of appropriate employee body parts for scanning and comparing biometric data extracted from the employee with biometric data representing physical characteristics of relating to the employee stored in the secured memory location. The same successive and sequential comparison method as has been described above can then be used to permit or deny access.

While the preferred embodiment of the present invention has been described, it should be appreciated that various modifications may be made by those skilled in the art without departing from the spirit and scope of the present invention. Accordingly, reference should be made to the claims that determine the scope of the invention.

I claim:

1. An individual recognition system comprising:

a storage medium storing as biometric data a plurality of physical characteristics of a user;

reading means for extracting from the user biometric data representing one of the physical characteristics stored by said storage medium;

comparison means for determining whether or not the extracted biometric data represents the same physical characteristic as corresponding stored biometric data obtained from said storage medium; and control means for instructing said reading means to extract from the user additional biometric data representing a different physical characteristic stored by said storage medium, depending on the determination by said comparison means.

2. A system according to claim 1, wherein the reading means includes a display for requesting that the user present one of the user's body parts for extraction of the biometric data corresponding thereto.

3. A system according to claim 2, wherein the body part is one of the user's fingers.

4. A system according to claim 1, wherein the storage medium comprises a portable storage medium.

5. A system according to claim 4, wherein the portable storage medium comprises an optical card.

6. A system according to claim 5, wherein said comparison means includes an optical card scanner.

7. A system according to claim 1, wherein said comparison means outputs a positive comparison result if a match is found between the extracted biometric data and the corresponding stored biometric data.

8. A system according to a claim 7, wherein the control means instructs said reading means to extract from the user additional biometric data if a positive result is not output by the comparison means.

9. A system according to claim 1, wherein said biometric data represents fingerprint data of a plurality of the user's fingers.

10. A system according to claim 9, wherein said reading means comprises a fingerprint scanner.

11. A system according to claim 9, wherein in the comparison performed in said comparing means, the extracted biometric data corresponds to a randomly selected first fingerprint of a user's hand, and if no match occurs upon a scan of the first fingerprint, a second fingerprint from a randomly selected other finger is selected by said control means.

12. A system according to claim 1, wherein said reading means comprises a retinal scanner.

13. An individual recognition system comprising:

a portable storage medium storing as biometric data a plurality of physical characteristics of a user;

reading means for extracting from the user biometric data representing one of the physical characteristics stored by said storage medium;

comparison means for determining whether or not the extracted biometric data represents the same physical characteristic as corresponding stored biometric data obtained from said storage medium and outputting a positive comparison result if a match occurs; and control means for instructing said reading means to extract from the user additional biometric data representing a different physical characteristic stored by said storage medium if said comparison means does not output a positive test result.

14. A system according to claim 13, wherein the reading means includes a display for requesting that the user present one of the user's body parts for extraction of the biometric data corresponding thereto.

15. A system according to claim 14, wherein the body part is one of the user's fingers.

16. A system according to claim 13, wherein the portable storage medium comprises an optical card.

17. A system according to claim 16, wherein said comparison means includes an optical card scanner.

18. A system according to claim 17, wherein said biometric data represents fingerprint data of a plurality of the user's fingers.

19. A system according to claim 18, wherein said reading means comprises a fingerprint scanner.

20. A system according to claim 18, wherein in the comparison performed in said comparing means, the extracted biometric data corresponds to a randomly selected first fingerprint of a user's hand, and if no match occurs upon a scan of the first fingerprint, a second fingerprint from a randomly selected other finger is selected by said control means.

21. A system according to claim 13, wherein said reading means comprises a retinal scanner.

22. A personal identification method using a data storage medium containing previously stored biometric data representing a plurality of physical characteristics of a user, the method comprising:

a first extracting step of extracting from the user biometric data representing one of the physical characteristics stored by the storage medium;

a determining step of determining whether or not the extracted biometric data represents the same physical characteristics as corresponding stored biometric data obtained from the storage medium; and a second extracting step of extracting from the user additional biometric data representing a different physical characteristic stored in the storage medium depending on the determination at said determining step.

23. A method according to claim 22, wherein the first extracting step requests that the user present one of the user's body parts for extraction of the biometric data corresponding thereto.

24. A method according to claim 23, wherein the body part is one of the user's fingers.

25. A method according to claim 23, wherein the storage medium comprises a portable storage medium.

26. A method according to claim 25, wherein the portable storage medium comprises an optical card.

27. A method according to claim 26, wherein said determining step is performed using an optical card scanner.

28. A method according to claim 23, wherein the biometric data represents fingerprint data of a plurality of the user's fingers.

29. A method according to claim 28, wherein said first extract step uses a fingerprint scanner.

30. A method according to claim 28, wherein in said first extracting step, the extracted biometric data corresponds to a randomly selected first fingerprint of a user's hand, and, if a match does not occur in said determining step, a second fingerprint from a randomly selected other finger is selected for extraction at said second extracting step.

31. A method according to claim 23, wherein said determining step outputs a positive comparison result if a match is found between the extracted biometric data and the corresponding stored biometric data.

32. A method according to claim 31, wherein the additional biometric data is extracted from the user if a positive result is not output at said determining step.

33. A method according to claim 23, wherein said first extraction step uses a retinal scanner.

34. A method for identifying one person from a plurality of persons, said method comprising the steps of:

gathering identification data representing a plurality of physical characteristics from each of the plurality of persons;

storing the gathered data; and providing apparatus for repeatedly obtaining different identification data representing respective ones of the plurality of physical characteristics from a person presenting himself or herself and comparing obtained identification data with stored data until the obtained identification data matches stored identification data for the respective physical characteristic.

35. A method according to claim 34, wherein the identification data repeatedly obtained at said providing step comprises biometric data corresponding to fingerprints of randomly selected different fingers of the person presenting himself or herself.

36. A method according to claim 34, wherein the identification data gathered at said gathering step comprises biometric data representing fingerprints of each of the plurality of persons and is stored on one of a plurality of optical cards, and each of the plurality of optical cards is issued to the person whose identifying data it contains, for presentation by such person to establish his or her identity.

37. A method according to claim 34, wherein said method is adapted to determine which persons from a population of persons is a qualified person, said method further comprising a step of analyzing the gathered identification data to verify whether or not each of the plurality of persons from whom data has been gathered is qualified.

* * * * *

UNITED STATES PATENT AND TRADEMARK OFFICE
CERTIFICATE OF CORRECTION

PATENT NO. : 5,815,252

DATED : September 29, 1998

INVENTOR(S): STEPHEN PRICE-FRANCIS

Page 1 of 2

It is certified that error appears in the above-identified patent and that said Letters Patent is hereby corrected as shown below:

Title page, item

[54] TITLE

"PARAMETERS" should read --PARAMETER--.

[73] ASSIGNEE

Insert: "Canon U.S.A., Lake Success, N.Y." as second assignee.

COLUMN 1

Line 3, "PARAMETERS" should read --PARAMETER--.
Line 27, "that those" should read --than those--.
Line 37, "user," should read --user--.

COLUMN 4

Line 64, "of" should read --for--.
Line 67, "identify" should read --identity--.

UNITED STATES PATENT AND TRADEMARK OFFICE
CERTIFICATE OF CORRECTION

PATENT NO. : 5,815,252

DATED : September 29, 1998

INVENTOR(S) : STEPHEN PRICE-FRANCIS

It is certified that error appears in the above-identified patent and that said Letters Patent is hereby corrected as shown below:

COLUMN 5

Line 18, "designate" should read --designated--.

COLUMN 6

Line 16, "acteristic" should read --acteristics--.

COLUMN 7

Line 61, "be" should read --being--.

COLUMN 8

Line 6, "of" should be deleted.

Signed and Sealed this

Seventh Day of March, 2000

Attest:

Attesting Officer

Q. TODD DICKINSON

Commissioner of Patents and Trademarks